No. 704,305. Patented July 8, 1902.
T. A. EDISON.
ELECTRODE FOR BATTERIES.
(Application filed May 17, 1901.)
(No Model.)
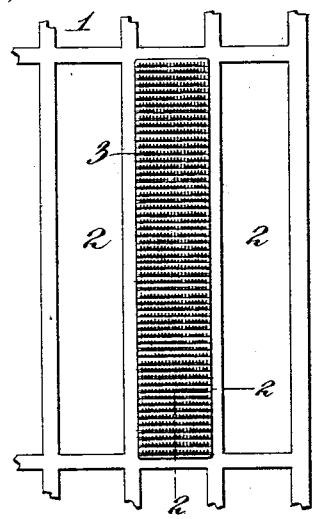
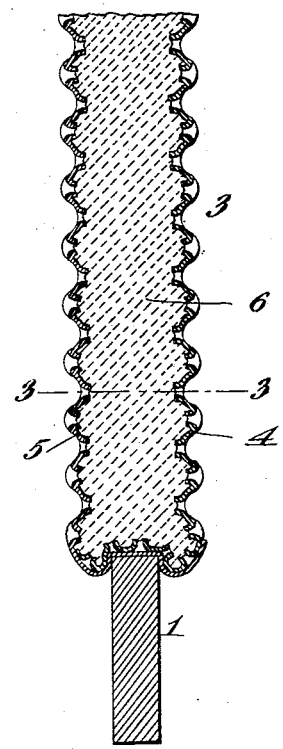
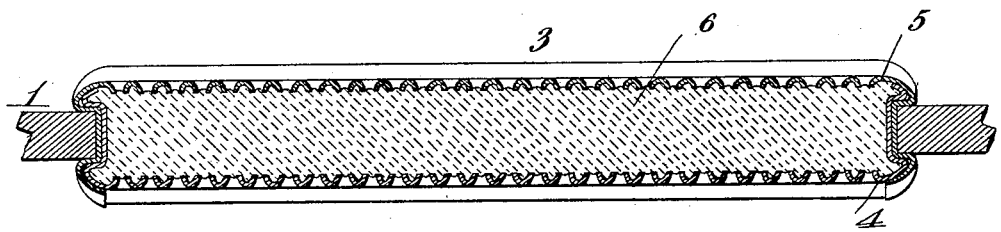
Witnesses:
Jas. F. Coleman
Archibald S. Reese
Inventor
Thomas A Edison
by Ayer Edmond & Ayer
Att'ys.
THE NORRIS PETERS CO., PHOTO-LITHO., WASHINGTON, D. C.

UNITED STATES PATENT OFFICE.

THOMAS A. EDISON, OF LLEWELLYN PARK, NEW JERSEY, ASSIGNOR TO EDISON STORAGE BATTERY COMPANY, A CORPORATION OF NEW JERSEY.

ELECTRODE FOR BATTERIES.

SPECIFICATION forming part of Letters Patent No. 704,305, dated July 8, 1902.

Application filed May 17, 1901. Serial No. 60,661. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Electrodes for Galvanic Batteries, (Case No. 1,059,) of which the following is a description.

My invention relates to improvements in electrodes for galvanic batteries, and particularly reversible or so-called "storage batteries;" and the improvements are especially designed for use with batteries wherein the active material is subject to changes in bulk, either due to absorption of the electrolyte or to other causes during charging or discharging.

In application for Letters Patent filed March 5, 1901, Serial No. 49,935, I have described an improved reversible galvanic battery employing oxid of nickel or of cobalt as the active material contained in perforated highly-elastic metallic pockets under pressure, whereby an expansion or contraction in bulk of the active material results in a consequent bulging or retraction of the pocket-walls to always maintain the desired intimate contact between the active material and such walls. I find that by corrugating the walls of the pockets or receptacles their stiffness will be largely increased, so that very thin sheet metal may be employed, and that by making the pockets or receptacles of thin spring-steel high in carbon and properly proportioning the capacity of each pocket or receptacle, so that the expansion and contraction of the active material will be kept within the elastic limits of the pocket-walls, a construction will be secured wherein at all times the walls of the pocket will be maintained in good electrical contact with the active material. It is of course of vital importance that there should be no failure of contact between the active material and the metal walls of the pockets or receptacles, because in that case the efficiency of the battery will be correspondingly affected. I therefore prefer to construct and assemble the sections of the pockets or receptacles in such a way that any expansion of the active material cannot force the sections apart to thereby result in failure of contact when the active material again contracts on discharge. To this end I make one section of each pocket or receptacle of greater depth than the other, so that the shallower section may be inserted within the deeper section, and when pressure is applied to crimp the sections in position in the grid or supporting-plate the projecting edge of the deeper section will be turned or reamed over upon the bottom of the other section to thereby lock the sections firmly together to resist any tendency of separation due to expansion of the active material.

The pockets or receptacles in which the active material is contained are made from a sheet-metal ribbon perforated by being passed between male and female die-rolls, which displace the metal without removing it at each opening, after which blanks of the desired size are cut out of the ribbon and bent into the desired cup shapes. If the sides are turned over in lines coincident with the perforations, the resulting construction will be weak and there will be danger of the metal rupturing at the bends of the sides when subjected to strains incident to the expansion of the active material. Besides, the perforating of the pockets at the sides is unnecessary, since the crimping pressure tends to close any perforations at those portions. I preferably, therefore, perforate the metal within the bends of the sides of the pocket-sections, so that the sides and the main faces thereof immediately adjacent thereto will be imperforate.

In order that the invention may be better understood, attention is directed to the accompanying drawings, forming a part of this specification, and in which—

Figure 1 is a plan of a portion of a grid, showing one of the pockets or receptacles in place; Fig. 2, a section on the line 2 2 of Fig. 1, and Fig. 3 a section on the line 3 3 of Fig. 2.

In all of the above views like parts are represented by corresponding numerals.

The grid 1 is made of a suitable sheet metal not affected by the electrolyte—as, for example, sheet-nickel or nickel-plated sheet steel or iron in the case of a battery using an alkaline solution. The grid is formed with openings 2 therein, preferably rectangular in shape, and fitted and secured in each opening is a receptacle or pocket 3, having perforated walls. Each pocket or receptacle 3 is made of two sections 4 and 5 fitted together. The preferable material of which the pockets or receptacles are made is spring-steel high in carbon and of great elasticity. A very thin ribbon of this material is passed through male and female die-rolls and perforated, the metal at each perforation being displaced without being removed and the bur extending inwardly. From this perforated ribbon blanks are cut of the proper shape, and the side and end walls are then turned over to form the sections. Preferably the walls are turned over outside of the perforations, so that the side bends will be imperforate. If the sides were turned over coincident with the lines of perforations, the resulting construction would be weak and there would be danger of the metal being ruptured when subjected to the strains incident to the expansion of the active material. The side walls of the section 5 of each pocket are made deeper than those of the section 4, so that when the section 4 is inserted within the section 5 the side walls of the latter will project beyond the perforated face of the former, as will be obvious. After the active material 6 is introduced in the smaller shallow section 4 the deep section 5 is fitted like a box-cover over it, and the pocket as a whole is introduced into one of the openings 2 and secured permanently in position by the application of pressure near its edges, which are crimped or burred over around the edge of the opening, as shown. The application of the crimping pressure also turns over the projecting side edges of the section 5 upon the section 4, so as to firmly lock the sections together to thereby effectively resist any tendency of the sections to separate or be forced apart by the expansion of the active material.

The principal novelty of the present improvement is the provision of corrugations or flutes in the pocket-walls, as illustrated, and which may be formed in any suitable way. These corrugations preferably extend crosswise of the pockets or horizontally from side to side, as I show; but obviously they may extend in other directions. I find that by corrugating or fluting the perforated walls of the pockets or receptacles, as explained, by making the receptacles of spring-steel high in carbon, and by proportioning the capacity of the receptacles so that the expansion of the active material will be kept within the limits of elasticity of the walls the pockets may be made of very thin material, thereby reducing the weight of the battery, and still will be of the necessary high elasticity to maintain at all times good electrical contact with the active material irrespective of changes in bulk of the latter.

Having now described my invention, what I claim as new, and desire to secure by Letters Patent, is as follows:

1. An electrode for a galvanic battery, comprising a support, a plurality of pockets or receptacles carried thereby and arranged in substantially the same plane, each pocket or receptacle being made of elastic metal with corrugated walls, and an active material in said pockets or receptacles, substantially as set forth.

2. An electrode for a galvanic battery, comprising a support, a plurality of pockets or receptacles carried thereby and arranged in substantially the same plane, each pocket or receptacle being made of elastic metal with horizontally-corrugated walls, and an active material in said pockets or receptacles, substantially as set forth.

3. An electrode for a galvanic battery comprising a grid having an opening therein, a pocket or receptacle secured in said opening and having corrugated walls, and an active material in said pocket or receptacle, substantially as set forth.

4. An electrode for a galvanic battery comprising a grid having an opening therein, a pocket or receptacle secured in said opening and having horizontally-corrugated walls, and an active material in said pocket or receptacle, substantially as set forth.

5. An electrode for a galvanic battery comprising a grid having a plurality of openings therein, a pocket or receptacle secured in each opening and having corrugated walls, and an active material in said pockets or receptacles, substantially as set forth.

6. An electrode for a galvanic battery, comprising a support, a plurality of pockets or receptacles carried thereby and arranged in substantially the same plane, each pocket or receptacle being made of interengaging sections of elastic metal with corrugated walls, and an active material in said pockets or receptacles, substantially as set forth.

7. An electrode for a galvanic battery comprising a support, a pocket or receptacle having corrugated walls and secured at its edges to said support, and an active material in said pocket or receptacle, substantially as set forth.

8. An electrode for a galvanic battery comprising a support, a pocket or receptacle carried thereby and having perforated outer faces and being formed of two sections, one of which is deeper than the other and the deeper being turned over upon the shallow section, and an active material in said pocket or receptacle, substantially as set forth.

9. An electrode for a galvanic battery comprising a support, a pocket or receptacle carried thereby made of elastic metal and formed of two cup-like sections fitted together, the main face of each section being perforated with numerous perforations within the sides thereof, and an active material in said pocket or receptacle, substantially as set forth.

10. An electrode for a galvanic battery comprising a support, a perforated receptacle carried thereby and made of highly-elastic metal, and an active material in said receptacle so proportioned in bulk in relation to the elasticity of the elastic metal that any changes in volume thereof will be within the elastic limits of the walls of said receptacle, substantially as set forth.

This specification signed and witnessed this 10th day of May, 1901.

THOMAS A. EDISON.

Witnesses:
J. F. RALDOLPH,
FRANK L. DYER.